United States Patent
Hell

(10) Patent No.: US 12,480,173 B2
(45) Date of Patent: Nov. 25, 2025

(54) COLD ROLLED ANNEALED STEEL SHEET WITH HIGH HOLE EXPANSION RATIO AND MANUFACTURING PROCESS THEREOF

(71) Applicant: ArcelorMittal, Luxembourg (LU)

(72) Inventor: Jean-Christophe Hell, Metz (FR)

(73) Assignee: ArcelorMittal, Luxembourg (LU)

( * ) Notice: Subject to any disclaimer, the term of this patent is extended or adjusted under 35 U.S.C. 154(b) by 939 days.

(21) Appl. No.: 17/294,173

(22) PCT Filed: Nov. 30, 2018

(86) PCT No.: PCT/IB2018/059510
§ 371 (c)(1),
(2) Date: May 14, 2021

(87) PCT Pub. No.: WO2020/109850
PCT Pub. Date: Jun. 4, 2020

(65) Prior Publication Data
US 2022/0010398 A1    Jan. 13, 2022

(51) Int. Cl.
| | |
|---|---|
| *C21D 9/46* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |

(52) U.S. Cl.
CPC ............. *C21D 9/46* (2013.01); *C21D 6/001* (2013.01); *C21D 6/005* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C21D 2211/001* (2013.01); *C21D 2211/005* (2013.01); *C21D 2211/008* (2013.01)

(58) Field of Classification Search
CPC .......... C21D 9/46; C21D 6/005; C21D 6/008; C21D 8/0205; C21D 8/0226; C21D 8/0236; C21D 2211/001; C21D 2211/005; C21D 2211/008; C21D 2211/002; C22C 38/02; C22C 38/04; C22C 38/06; C22C 38/12

See application file for complete search history.

(56) References Cited

U.S. PATENT DOCUMENTS

| | | |
|---|---|---|
| 2004/0074575 A1 | 4/2004 | Kashima et al. |
| 2011/0209803 A1* | 9/2011 | Sugimoto ............... C22C 38/04 148/333 |
| 2015/0267281 A1 | 9/2015 | Song et al. |
| 2015/0267282 A1 | 9/2015 | Schaffnit et al. |
| 2016/0160309 A1 | 6/2016 | Allain et al. |
| 2017/0101695 A1 | 4/2017 | Arlazarov et al. |
| 2018/0171459 A1 | 6/2018 | Drillet et al. |

FOREIGN PATENT DOCUMENTS

| | | | |
|---|---|---|---|
| CN | 103695618 | A | 4/2014 |
| CN | 104388821 | A | 3/2015 |
| CN | 105518175 | A | 4/2016 |
| CN | 106636899 | A | 5/2017 |
| CN | 106661650 | A | 5/2017 |
| CN | 107002155 | A | 8/2017 |
| CN | 107614732 | A | 1/2018 |
| CN | 108463340 | A | 8/2018 |
| CN | 108884512 | A | 11/2018 |
| EP | 1676933 | A1 | 7/2006 |
| EP | 3279362 | A1 | 2/2018 |
| JP | H0617188 | A | 1/1994 |
| JP | 2002302734 | A | 10/2002 |
| JP | 2004332099 | A * | 11/2004 |
| JP | 2012041613 | A | 3/2012 |
| JP | 2015224359 | A * | 12/2015 |
| JP | 2016160468 | A | 9/2016 |
| JP | 2016180139 | A | 10/2016 |
| JP | 2017053001 | A | 3/2017 |
| JP | 2017145467 | A | 8/2017 |
| JP | 2017186647 | A | 10/2017 |
| KR | 20170131606 | A | 11/2017 |
| RU | 2437945 | C2 | 6/2011 |
| RU | 2556253 | C1 | 7/2015 |
| RU | 2660482 | C2 | 7/2018 |
| WO | WO2012164579 | A1 | 12/2012 |

(Continued)

OTHER PUBLICATIONS

Scott, C.P, et al. "New insights into martensite strength and the damage behavior of dual phase steels", Acta Materialia, vol. 159, pp. 112-122, (2018).

(Continued)

*Primary Examiner* — Jonathan Johnson
(74) *Attorney, Agent, or Firm* — Davidson Kappel LLC

(57) ABSTRACT

A cold rolled annealed steel sheet having a chemical composition including, in weight %: $0.30\% \leq C \leq 0.50\%$, $1.00\% \leq Mn \leq 2.50\%$, $1.00\% \leq Si \leq 2.00\%$, $Al \leq 2.00\%$, $Cr \leq 0.100\%$, $0.100\% \leq Mo \leq 0.500\%$, $0.020\% \leq Nb \leq 0.200\%$, $B \leq 0.0005\%$, $P \leq 0.02\%$, $S \leq 0.005\%$, $N \leq 0.01\%$, the remainder being Fe and unavoidable impurities, with the percentages in carbon, manganese, chromium, molybdenum and boron are such that the alloy satisfies the following condition: $250\% C + 120\% Mn - 200\% Cr + 200\% Mo - 10000\% B \geq 320$, and wherein the microstructure comprises in surface fraction, 35% to 45% of islands of martensite and retained austenite (M-A), the total retained austenite is higher than or equal to 24%, the remainder consisting of bainitic ferrite.

21 Claims, No Drawings

(56) References Cited

FOREIGN PATENT DOCUMENTS

| | | |
|---|---|---|
| WO | WO2014040585 A1 | 3/2014 |
| WO | WO2015011554 A1 | 1/2015 |
| WO | WO2015151443 A1 | 10/2015 |
| WO | WO 2015/177582 A1 | 11/2015 |
| WO | WO 2016/001706 A1 | 1/2016 |
| WO | WO2017108959 A1 | 6/2017 |
| WO | WO2018127984 A1 | 7/2017 |
| WO | WO2018202916 A1 | 11/2018 |
| WO | WO 2019092483 A1 | 5/2019 |

OTHER PUBLICATIONS

See Search Report of PCT/IB2018/059510 dated Aug. 26, 2019.

* cited by examiner

COLD ROLLED ANNEALED STEEL SHEET WITH HIGH HOLE EXPANSION RATIO AND MANUFACTURING PROCESS THEREOF

The present invention relates to a cold-rolled annealed steel sheet presenting a microstructure mainly comprising bainitic ferrite. The steel sheet can be used for the manufacturing of structural parts of automotive vehicles.

BACKGROUND

One of the major challenges in the automotive industry is to decrease the weight of vehicles to reduce CO2 emissions, without neglecting the safety requirements. New high strength steels are continuously developed by the steelmaking industry to meet these requirements. As the use of high strength steels in automotive applications increases, there is a growing demand for steels having both an increased strength and an improvement in hole expansion performance. Thus, several families of steels offering various strength levels have been proposed.

In the publication WO2015011554, a cold rolled steel sheet is produced with a tensile strength higher than 900 MPa and a yield strength higher than 700 MPa. The microstructure of this cold rolled steel sheet comprises between 13% and 30% of martensite and retained austenite islands, between 13% and 25% of retained austenite, the remainder being bainite and ferrite. This proportion of martensite and retained austenite islands induces a low ductility steel, with a uniform elongation lower than 16%.

In the publication WO2012164579, a hot rolled bainitic steel sheet is produced with a tensile strength higher than 1300 MPa and a total elongation higher than 20%. This steel does not contain alloying elements, but a large amount of chromium is added in order to improve the hardenability of the steel. But during welding, the softening of the steel can be reduced in the heat affected zone with formation of carbides with chromium.

The publication EP1676933 describes a cold rolled and annealed steel sheet, with a tensile strength higher than 1180 MPa, and a microstructure composed of more than 90% of bainitic ferrite and martensite and at least 3% of retained austenite. This microstructure increases hardenability of steel, but reduces the ductility, with an elongation lower than 15%.

In the publication WO2014040585, a low alloy carbide free bainitic steel is produced with, in particular a combination of high content of chromium, which decelerates the ferritic phase transformation, and aluminium allowing to control kinetics of bainite and ferrite formation.

SUMMARY OF THE INVENTION

It is an object of the present invention to provide a steel sheet presenting a tensile strength higher than 1100 MPa, a uniform elongation higher than 16% and a hole expansion ratio higher than 15%

In a preferred embodiment, the steel sheet of the invention presents a hole expansion ratio higher than or equal to 24%. In a preferred embodiment, the steel sheet of the invention presents a tensile strength higher than 1180 MPa.

The present invention provides a cold rolled annealed steel sheet having a chemical composition comprising, in weight %:

0.30%≤C≤0.50%
1.00%≤Mn≤2.50%
1.00%≤Si≤2.00%
Al≤2.00%,
Cr≤0.100%,
0.100%≤Mo≤0.500%,
0.020%≤Nb≤0.200%
B≤0.0005%,
P≤0.02%,
S≤0.005%,
N≤0.01%, the remainder being Fe and unavoidable impurities, with the percentages in carbon, manganese, chromium, molybdenum and boron are such that the alloy satisfies the following condition:

$$250\% \text{ C} + 120\% \text{ Mn} - 200\% \text{ Cr} + 200\% \text{ Mo} - 10000\% \text{ B} \geq 320,$$

and wherein the microstructure comprises in surface fraction, 35% to 45% of islands of martensite and retained austenite (M-A), the total retained austenite is higher than or equal to 24%, the remainder consisting of bainitic ferrite.

The present invention also provides a method for producing a steel sheet comprising the following steps:

providing a steel semi-product with composition as outlined above, heating the said steel semi-product with a temperature comprised between 1150° C. and 1300° C., so to obtain reheated steel semi-product hot rolling said reheated steel semi-product with a final rolling temperature higher than or equal to 800° C., so to obtain a hot rolled steel sheet, coiling the hot rolled steel sheet at a temperature $T_{coil}$ between 400° C. and 590° C., so to obtain a coiled steel sheet optionally, heat treating said coiled steel sheet, cold rolled the coiled steel sheet with a reduction rate between 30% and 80%, so to obtain a cold rolled steel sheet, heating the cold rolled steel sheet at a heating rate $V_H$ between 2° C./s and 50° C./s to a soaking temperature $T_{soak}$ higher than Ac3+20° C. and lower than 1000° C., for a duration $t_{soak}$ higher than 60 s, so to obtain an annealed steel sheet, cooling the annealed steel sheet with a cooling rate $V_C$ between 20° C./s and 1000° C./s to an overaging temperature $T_{OA}$ higher than 385° C. and lower than 450° C., holding the cooled annealed steel sheet at overaging temperature $T_{OA}$ for a duration $t_{OA}$ higher than or equal to 270 s.

The invention will now be described in more details, but without limitations.

DETAILED DESCRIPTION

To reach the desired microstructural and mechanical features, the chemical composition and process parameters are of significant importance. The steel, composition, expressed in weight percentage, is as follows:

0.30%≤C≤0.50%: If the carbon content is lower than 0.30%, the retained austenite fraction is insufficient to achieve more than 16% of uniform elongation. If the carbon content exceeds 0.50%, weldability of the steel sheet may be reduced.

1.00%≤Mn≤2.50%: when the manganese content is less than 1.00%, total retained austenite is insufficient to obtain desired mechanical properties. If the manganese exceeds 2.50%, the risk of central segregation increases to the detriment of the yield strength, the tensile strength and the hole expansion value. In a preferred embodiment of the invention, the manganese content is between 1.30% and 2.10%, to limit the risk of micro segregation and the alignment of hard phases in segregated areas.

1.00%≤Si≤2.00%: Silicon is an element used for deoxidation in the liquid stage and for achieving solution hardening. The silicon content has to be higher than 1.00% to stabilize retained austenite. Preferably, the content of silicon is above 1.4%. If the silicon content exceeds 2.00%, ferrite formation is promoted and the desired tensile strength and elongation are not achieved.

Al≤2.00%: aluminium addition contributes to efficient deoxidation in the liquid stage and favours the stabilization of ferrite. Aluminium content is limited to 2.00%, to avoid formation of ferrite, and thus to obtain the yield and tensile strength levels requested in the invention. Preferably, the aluminium content is below 1.00%, and more preferably it is below 0.50%, or even below 0.10%.

Cr≤0.100%: Chromium is an alloying element that slow down the bainitic transformation kinetics and hinder the maximum fraction of bainite. Its content is limited to 0.100% to maximize the bainite fraction and thus to ensure good stabilization of retained austenite and limit the formation of martensite, and thus to obtain the mechanical properties of the invention. Preferably, the chromium content is limited to 0.05% and more preferably it is limited to 0.01%.

0.100%≤Mo≤0.500%: Molybdenum is an element which favorizes stabilization of retained austenite. Below 0.100%, such an effective effect is not achieved. Beyond 0.500%, bainite fraction is reduced and martensite formation is promoted, thus hardening the sheet and reducing ductility. Moreover, kinetic of phase transformation will be slowed down. Preferably, the content of molybdenum is lower than 0.400%, or even lower than 0.300%, to avoid carbides stabilization which would not be dissolved in the soaking step during annealing.

0.020%≤Nb≤0.200% Niobium is a micro-alloy element which forms precipitates, hardening with carbon or nitrogen. The microstructure is then refined, resulting in greater ductility. When niobium content is less than 0.020%, such effective effect is not achieved. However, niobium content is limited to 0.200% to avoid excessive hardening effect. Preferably, the niobium content is limited to 0.100%.

B≤0.0005%: Boron is an element slowing down phase transformation. If the boron content exceeds 0.0005%, bainite fraction is reduced and martensite formation is promoted, thus hardening the sheet and reducing ductility.

According to the invention, the percentages in carbon, manganese, chromium, molybdenum and boron are such that the alloy satisfies the following condition: 250% C+120% Mn−200% Cr+200% Mo−10000% B≥320. Carbon, manganese et molybdenum are elements which favorize stabilization of retained austenite, while chromium and boron slow down kinetic of phase transformation and limit bainite fraction.

P≤0.02%: If phosphorous content exceeds 0.02%, segregation at grain boundary may occur and the elongation of the steel sheet may be reduced.

S≤0.005%: The sulphur content is limited at 0.005% so to lower the formation of sulphides which are detrimental regarding the sheet ductility.

N≤0.01%: If nitrogen content exceeds 0.01%, certain elements may precipitate in the liquid or in the solid state under the form of nitrides or carbonitrides. Coarse precipitates must be avoided since they reduce the ductility of the steel sheet.

The balance of the composition is iron and unavoidable impurities like titanium, copper, nickel and vanadium resulting from the smelting, tolerated up to 0.01% for titanium, copper and nickel, and up to 0.005% for vanadium.

The microstructure of the cold rolled annealed rolled steel sheet according to the invention will now be detailed.

According to the invention, the microstructure of the steel comprises in surface fraction, 35% to 45% of islands of martensite and retained austenite (M-A). If the M-A content is lower than 35%, the total retained austenite content is insufficient to reach the uniform elongation minimum value of 16%. If the M-A content exceed 45%, the hole expansion rate will be reduced, by the effect of excessive martensite formation.

According to the invention, the total retained austenite of the steel is higher than or equal to 24%, to obtain desired tensile strength, uniform elongation and hole expansion rate.

In a preferred embodiment, the microstructure of the steel comprises in surface fraction less than 16% of martensite. This martensite is formed during the final cooling after the overaging step. If the martensite fraction is above 16%, the hole expansion ratio of the steel sheet may be reduced because of the increase of hardenability of the steel.

The remainder of the microstructure consists of bainitic ferrite.

The steel sheet according to the invention can be produced by any appropriate manufacturing method and a person skilled in the art can define one. It is however preferred to use the method according to the invention, which comprises the following steps:

providing a steel semi-product with composition described above, heating the said steel semi-product with a temperature comprised between 1150° C. and 1300° C., so to obtain reheated steel semi-product hot rolling said reheated steel semi-product with a final rolling temperature higher than or equal to 800° C., so to obtain a hot rolled steel sheet, coiling the hot rolled steel sheet at a temperature $T_{coil}$ between 400° C. and 590° C., so to obtain a coiled steel sheet optionally, heat treating said coiled steel sheet, cold rolled the coiled steel sheet with a reduction rate between 30% and 80%, so to obtain a cold rolled steel sheet, heating the cold rolled steel sheet at a heating rate $V_H$ between 2° C./s and 50° C./s to a soaking temperature $T_{soak}$ higher than Ac3+20° C. and lower than 1000° C., for a duration $t_{soak}$ higher than 60 s, so to obtain an annealed steel sheet, cooling the annealed steel sheet with a cooling rate $V_C$ between 20° C./s and 1000° C./s to an overaging temperature $T_{OA}$ higher than 385° C. and lower than 450° C., holding the cooled annealed steel sheet at overaging temperature $T_{OA}$ for a duration $t_{OA}$ higher than or equal to 270 s.

The steel sheets according to the present invention are preferably produced through a method in which a semi product, such as slabs, thin slabs, or strip made of a steel according to the present invention having the composition described above, is cast, the cast input stock is heated to a temperature between 1150° C. and 1300° C. or used directly at such a temperature after casting, without intermediate cooling.

The semi product is then hot rolled with a final rolling temperature higher than or equal to 800° C., so to obtain a hot rolled steel sheet, to avoid any cracking problem through lack of ductility by the formation of ferrite in bands.

The hot rolled steel sheet is then coiled at a temperature $T_{coil}$ between 400° C. and 590° C., so to obtain a coiled steel sheet. If the coiling temperature is lower than 400° C., the hardness of the steel after cooling is increased. If the temperature of coiling is higher than 590° C., undesirable surface oxides may be formed. Preferably, the coiled temperature is between 500° C. and 590° C.

A pickling step can be added after coiling so to remove surface oxides.

A heat treatment of the coiled steel sheet may be performed, to a heat-treating temperature $\theta_A$ between 400° C. and 700° C., the duration at said heat treating temperature being comprised between 30 s and 200 hours. Duration of the heat treatment should be adapted with the heat-treating temperature given that long durations are adapted to low temperatures and short durations are adapted to high temperatures.

A pickling step can be added after the heat treatment so to remove surface oxides. The steel is then cold rolled with a reduction rate between 30% and 80%, so to obtain a cold rolled steel sheet.

The cold rolled steel sheet is then heated at a heating rate $V_H$ between 2° C./s and 50° C./s. Below 2° C./s, deep decarburization cannot be avoided leading to a softening of the surface and thus the desired mechanical properties cannot be achieved. Above 50° C./s, phase transformations may interfere with recrystallization leading to a partially unrecrystallized microstructure with low ductility. Preferably, the heating rate $V_H$ is between 10° C./s and 40° C./s.

The cold rolled steel sheet is heated up to a soaking temperature $T_{soak}$ higher than Ac3+20° C. and lower than 1000° C., for a duration $t_{soak}$ higher than 60 s, so to obtain an annealed steel sheet. If $T_{soak}$ is lower than Ac3+20° C., ferrite formation is promoted and the desired microstructure and then mechanical properties are not achieved.

The Ac3 temperature is calculated from a formula derived by Andrews published in Journal of the Iron and Steel Institute, 203, 721-727, 1965:

Ac3 (° C.)=910−203×(% C)^(½)−15.2×(% Ni)+44.7×(% Si)+104×(% V)+31.5×(% Mo)+13.1×(% W)−30×(% Mn)−11×(% Cr)−20×(% Cu)+700×(% P)+400×(% Al)+120×(% As)+400×(% Ti)

However, if the temperature $T_{soak}$ is higher than 1000° C., the austenite grain sizes excessively increase, which has an adverse effect on the elastic properties. Preferably, the soaking temperature is below 900° C. If the duration of the soaking is shorter than 60 s, the carbides dissolution would be insufficient. Preferably, the soaking time is above 100 s.

After the heat treatment, the annealed steel sheet is cooled at a cooling rate $V_C$ higher than 20° C./s to avoid ferrite formation and lower than 1000° C./s, to reach an overaging temperature $T_{OA}$ comprises between 385° C. and 450° C., so to obtain a cooled steel sheet. Preferably the cooling rate is below 500° C./s, and more preferably below 100° C./s. If the steel is cooled to a temperature below 385° C., the content of bainite is too large and the content of retained austenite insufficient. The uniform elongation will not reach the targeted value. On the contrary, if $T_{OA}$ is higher than 450° C., the bainite content is too low and excessive martensite formation will occur which decreases ductility.

The steel is held at $T_{OA}$ temperature for a duration to higher than or equal to 270 s, to obtain the stabilization of the austenite and refinement of M-A islands. Overaging duration shorter than 270 s limits the formation of bainite hence hinders the stabilization of the austenite and thus promotes formation of excessive martensite reducing the ductility. The steel sheet is cooled down to room temperature.

After this final cooling step, the steel sheet may optionally be submitted to a metallic coating operation to improve its protection against corrosion. The coating process used can be any process adapted to the steel of the invention. Electrolytic or physical vapor deposition can be cited, with a particular emphasis on Jet Vapor Deposition. The metallic coating can be based on zinc or on aluminium, for example.

The invention will be now illustrated by the following examples, which are by no way limitative.

Examples

Semi products were provided with compositions detailed in table 1, expressed in percent by weight. Steels A-D correspond to the composition of the invention.

The table 2 details the manufacturing conditions which have been applied. Trials 1-5 correspond to the invention.

TABLE 1

Steel compositions (weight %)

| Steel | C | Mn | Si | Al | Cr | Mo | Nb | P | S | N | B | Ti | Cu | Ni | V | Relation |
|---|---|---|---|---|---|---|---|---|---|---|---|---|---|---|---|---|
| A | 0.41 | 1.53 | 1.50 | 0.027 | 0.002 | 0.191 | 0.068 | 0.010 | 0.001 | 0.004 | 0.0003 | 0.002 | 0.002 | 0.002 | 0.002 | 321 |
| B | 0.39 | 1.77 | 1.49 | 0.025 | 0.002 | 0.189 | 0.065 | 0.010 | 0.001 | 0.005 | 0.0003 | 0.002 | 0.002 | 0.002 | 0.002 | 345 |
| C | 0.41 | 1.56 | 1.49 | 0.025 | 0.002 | 0.265 | 0.059 | 0.011 | 0.002 | 0.006 | 0.0004 | 0.002 | 0.002 | 0.002 | 0.002 | 337 |
| D | 0.40 | 1.71 | 1.68 | 0.024 | 0.002 | 0.186 | 0.057 | 0.010 | 0.002 | 0.004 | 0.0003 | 0.002 | 0.002 | 0.002 | 0.002 | 340 |
| E | 0.30 | 1.50 | 1.48 | 0.003 | 0.006 | 0.002 | 0.010 | 0.012 | 0.002 | 0.005 | 0.0004 | 0.001 | 0.007 | 0.005 | 0.002 | 249 |
| F | 0.29 | 2.00 | 1.47 | 0.003 | 0.010 | 0.002 | 0.031 | 0.010 | 0.006 | 0.003 | 0.0006 | 0.001 | 0.002 | 0.006 | 0.002 | 305 |
| G | 0.30 | 2.11 | 1.52 | 0.007 | 0.449 | 0.002 | 0.030 | 0.010 | 0.006 | 0.005 | 0.0006 | 0.001 | 0.002 | 0.006 | 0.002 | 233 |
| H | 0.40 | 1.51 | 1.46 | 0.005 | 0.003 | 0.002 | 0.002 | 0.013 | 0.002 | 0.005 | 0.0005 | 0.001 | 0.002 | 0.009 | 0.002 | 276 |
| I | 0.40 | 1.50 | 1.46 | 0.007 | 0.560 | 0.002 | 0.060 | 0.013 | 0.002 | 0.007 | 0.0006 | 0.001 | 0.002 | 0.009 | 0.002 | 161 |
| J | 0.41 | 1.73 | 1.59 | 0.028 | 0.002 | 0.002 | 0.060 | 0.011 | 0.001 | 0.003 | 0.0003 | 0.002 | 0.002 | 0.002 | 0.002 | 306 |
| K | 0.40 | 1.70 | 1.68 | 0.021 | 0.002 | 0.185 | 0.058 | 0.012 | 0.002 | 0.005 | 0.0025 | 0.260 | 0.002 | 0.002 | 0.002 | 316 |

Underlined values: not corresponding to the invention.

TABLE 2

Manufacturing conditions

| Trial | Steel sheet | Heating temperature (° C.) | Finish hot rolling temperature (° C.) | $T_{coil}$ (° C.) | HBA $T_{HBA}$ (° C.) | Cold rolling Reduction ratio (%) | $V_H$ (° C./s) | Soaking $T_{soak}$(° C.) | $t_{soak}$(s) | Cooling rate $V_C$ (° C./s) | Overaging $T_{OA}$(° C.) | $t_{OA}$(s) | Ac3 (° C.) |
|---|---|---|---|---|---|---|---|---|---|---|---|---|---|
| 1 | A | 1250 | 800 | 550 | 650 | 50 | 12 | 860 | 120 | 50 | 400 | 300 | 826 |
| 2 | A | 1250 | 800 | 550 | 650 | 50 | 12 | 860 | 120 | 50 | 430 | 300 | 826 |
| 3 | B | 1250 | 800 | 550 | 650 | 50 | 12 | 860 | 120 | 50 | 400 | 300 | 821 |
| 4 | C | 1250 | 800 | 550 | 650 | 50 | 12 | 860 | 120 | 50 | 400 | 300 | 827 |
| 5 | C | 1250 | 800 | 550 | 650 | 50 | 12 | 860 | 120 | 50 | 430 | 300 | 827 |
| <u>6</u> | <u>E</u> | 1248 | 955 | 570 | 650 | 67 | 5 | <u>830</u> | 180 | 95 | 400 | 500 | 830 |
| <u>7</u> | <u>F</u> | 1270 | 950 | 550 | 550 | 67 | 5 | <u>850</u> | 120 | 95 | 400 | 500 | 815 |
| <u>8</u> | <u>G</u> | 1270 | 950 | 550 | 550 | 67 | 5 | 850 | 120 | 95 | 400 | 500 | 809 |
| <u>9</u> | <u>H</u> | 1270 | 950 | 550 | 550 | 50 | 5 | 850 | 120 | 95 | 425 | 500 | 813 |
| <u>10</u> | <u>I</u> | 1270 | 950 | 550 | 550 | 50 | 5 | 850 | 120 | 95 | 400 | 500 | 808 |
| <u>11</u> | <u>I</u> | 1270 | 950 | 550 | 550 | 50 | 5 | 850 | 120 | 95 | 425 | 500 | 808 |
| <u>12</u> | <u>J</u> | 1250 | 800 | 450 | 650 | 50 | 12 | 860 | 120 | 50 | <u>370</u> | 450 | 819 |
| <u>13</u> | <u>J</u> | 1250 | 800 | 450 | 650 | 50 | 12 | 860 | 120 | 50 | <u>430</u> | <u>250</u> | 819 |
| <u>14</u> | <u>D</u> | 1250 | 800 | 450 | 650 | 50 | 12 | 860 | 120 | 50 | <u>370</u> | <u>450</u> | 829 |
| <u>15</u> | <u>K</u> | 1250 | 800 | 450 | 650 | 50 | 12 | <u>860</u> | 120 | 50 | <u>400</u> | 1800 | 932 |

Underlined values: not corresponding to the invention.

TABLE 3

Microstructural features of the heat-treated final steel sheet.

| Trial | Ferritic bainite (%) | MA islands (%) | Martensite (%) | Total retained austenite $\gamma_{tot}$ (%) |
|---|---|---|---|---|
| 1 | 62 | 38 | 13 | 25 |
| 2 | 60 | 40 | 13 | 27 |
| 3 | 60 | 40 | 14 | 26 |
| 4 | 61 | 39 | 15 | 24 |
| 5 | 61 | 39 | 12 | 27 |
| <u>6</u> | 70 | 30 | 13 | <u>17</u> |
| <u>7</u> | 63 | <u>37</u> | 18 | <u>19</u> |
| <u>8</u> | 61 | 39 | 20 | <u>19</u> |
| <u>9</u> | 58 | 42 | 25 | <u>17</u> |
| <u>10</u> | 58 | 42 | 28 | <u>14</u> |
| <u>11</u> | 58 | 42 | 30 | <u>12</u> |
| <u>12</u> | 70 | 30 | 14 | <u>16</u> |
| <u>13</u> | 63 | <u>37</u> | 16 | <u>21</u> |
| <u>14</u> | 72 | <u>28</u> | 13 | <u>15</u> |
| <u>15</u> | 44 | <u>56</u> | 35 | <u>21</u> |

Underlined values: not corresponding to the invention.

TABLE 4

Mechanical properties of the final steel sheet.

| Trial | TS (MPa) | UEl(%) | HER(%) |
|---|---|---|---|
| 1 | 1153 | 18 | 30 |
| 2 | 1165 | 21 | 19 |
| 3 | 1381 | 16 | 26 |
| 4 | 1212 | 18 | 24 |
| 5 | 1199 | 17 | 18 |
| <u>6</u> | <u>931</u> | <u>14</u> | 37 |
| <u>7</u> | <u>1097</u> | <u>14</u> | 21 |
| <u>8</u> | <u>1428</u> | <u>12</u> | <u>3</u> |
| <u>9</u> | 1108 | <u>15</u> | <u>25</u> |
| <u>10</u> | 1358 | <u>16</u> | <u>8</u> |
| <u>11</u> | 1422 | 15 | <u>2</u> |
| <u>12</u> | 1189 | <u>11</u> | <u>28</u> |
| <u>13</u> | 1076 | <u>23</u> | 21 |
| <u>14</u> | <u>1321</u> | <u>13</u> | 20 |
| <u>15</u> | 1286 | <u>14</u> | <u>7</u> |

Underlined values: do not reach target TS, UEl or HER values.

The microstructure of the heat-treated steel sheet was determined on polished specimens etched with Klemm and observed with Scanning Electron Microscope. The surface fraction of total retained austenite was measured by X-Ray Diffraction and Rietveld refinement and the surface fraction of M-A islands through image analysis. The proportion of the constituents are reported in Table 3. The table 4 gathers the mechanical properties of the final heat-treated steel sheet. The tensile strength TS and the uniform elongation UEI have been determined according to ISO 6892-1:2016. Hole expansion ratio HER has been determined according to ISO 16630:2017.

The hole expansion method consists of measuring the initial diameter Di of a hole before stamping (nominally: 10 mm), then the final diameter Df of the hole after stamping, determined when through cracks are observed in the thickness direction of the sheet on the edges of the hole. The hole expansion ratio HER is determined according to the following formula: HER=100*(Df−Di)/Di. HER is therefore used to quantify the ability of a sheet to withstand stamping at the level of a cut orifice.

In the trials 1-5, compositions and manufacturing conditions correspond to the invention. Thus, the desired microstructure and mechanical properties are obtained. Trials 6-13 and 15 do not match with the composition of the invention. Trials 6-13 have very small content of molybdenum, which is a stabilizer element of retained austenite. Thus, the desired total retained austenite level is not reached, and the uniform elongation is reduced.

Moreover, the trials 6 and 9 do not contain enough niobium to refine microstructure, leading to low uniform elongation.

In trials 8, 10 and 11, the excess of boron and especially the excess of chromium lead to undesired microstructure with high fraction of martensite and low fraction of total retained austenite which decrease the ductility of the microstructure leading to low uniform elongation. In addition, high amount of martensite also hinders the hole expansion rate since martensite is brittle and present early damages during expansion of the hole.

In trial 15, the steel contains a large amount of boron. Martensite formation is promoted, reducing amount of bainite and thus hardening the sheet and reducing ductility.

In trials 12 and 14, the temperature of overaging is lower than the limit of the invention, accentuating the low level of retained austenite, which decrease the ductility of the microstructure leading to low uniform elongation. In trial 13, the holding time of the overaging is too short to obtain the stabilization of the austenite and refinement of M-A islands. As a result, the steel sheet does not fulfill the requested mechanical properties.

What is claimed is:

1. A cold rolled annealed steel sheet having a chemical composition comprising, in weight %:
   0.30%≤C≤0.50%
   1.00%≤Mn≤2.50%
   1.00%≤Si≤2.00%
   Al≤2.00%,
   Cr≤0.100%,
   0.100%≤Mo≤0.500%,
   0.020%≤Nb≤0.200%
   B≤0.0005%,
   P≤0.02%,
   S≤0.005%,
   N≤0.01%,
   a remainder being Fe and unavoidable impurities, with the percentages in carbon, manganese, chromium, molybdenum and boron are such that the alloy satisfies the following condition:

250% C+120% Mn−200% Cr+200% Mo−10000% B≥320, and a microstructure consisting of in surface fraction, 35% to 45% of islands of martensite and retained austenite (M-A), a total of the retained austenite being higher than or equal to 24%, and a remainder consisting of bainitic ferrite.

2. The steel sheet as recited in claim 1 wherein the manganese content is between 1.30% and 2.10%.

3. The steel sheet as recited in claim 1 wherein the molybdenum content is between 0.100% and 0.400%.

4. The steel sheet as recited in claim 1 wherein the microstructure includes in surface fraction less than 16% of martensite.

5. The steel sheet as recited in claim 1 wherein the tensile strength TS is higher than 1100 MPa, the uniform elongation UEl is higher than or equal to 16% and the hole expansion rate higher than 15%.

6. The steel sheet as recited in claim 1 wherein the hole expansion ratio is higher than or equal to 24%.

7. The steel sheet as recited in claim 1 wherein the tensile strength TS is higher than 1180 MPa.

8. A method for producing the steel sheet as recited in claim 1 comprising the following steps:
   providing a steel semi-product with composition comprising, in weight %:
   0.30%≤C≤0.50%
   1.00%≤Mn≤2.50%
   1.00%≤Si≤2.00%
   Al≤2.00%,
   Cr≤0.100%,
   0.100%≤Mo≤0.500%,
   0.020%≤Nb≤0.200%
   B≤0.0005%,
   P≤0.02%,
   S≤0.005%,
   N≤0.01%,
   a remainder being Fe and unavoidable impurities, with the percentages in carbon, manganese, chromium, molybdenum and boron are such that the alloy satisfies the following condition: 250% C+120% Mn−200% Cr+200% Mo−10000% B≥320;
   heating the steel semi-product to temperature between 1150° C. and 1300° C., so to obtain a reheated steel semi-product;
   hot rolling the reheated steel semi-product with a final rolling temperature higher than or equal to 800° C., so to obtain a hot rolled steel sheet;
   coiling the hot rolled steel sheet at a temperature $T_{coil}$ between 400° C. and 590° C., so to obtain a coiled steel sheet;
   optionally, heat treating said coiled steel sheet;
   cold rolling the coiled steel sheet with a reduction rate between 30% and 80%, so to obtain a cold rolled steel sheet;
   heating the cold rolled steel sheet at a heating rate $V_H$ between 2° C./s and 50° C./s to a soaking temperature $T_{soak}$ higher than Ac3+20° C. and lower than 1000° C., for a duration $t_{soak}$ higher than 60 s, so to obtain an annealed steel sheet;
   cooling the annealed steel sheet with a cooling rate $V_C$ between 20° C./s and 1000° C./s to an overaging temperature $T_{OA}$ higher than 385° C. and lower than 450° C.; and
   holding the cooled annealed steel sheet at overaging temperature $T_{OA}$ for a duration $t_{OA}$ higher than or equal to 270 s,
   so as to form the microstructure.

9. The method as recited in claim 8 wherein the temperature $T_{coil}$ is between 500° C. and 590° C.

10. The method as recited in claim 8 wherein the coiled steel sheet is heat treated to a heat-treating temperature $\theta_A$ between 400° C. and 700° C., the duration at said heat treating being comprised between 30 s and 200 h.

11. A method for manufacturing structural parts of vehicles comprising using the steel sheet as recited in claim 1.

12. A method for manufacturing structural parts of vehicles comprising performing the method as recited in claim 8.

13. The steel sheet as recited in claim 1 wherein the microstructure includes in surface fraction 12%≤martensite<16%.

14. The steel sheet as recited in claim 5 wherein the hole expansion ratio is higher than or equal to 24%.

15. The steel sheet as recited in claim 14 wherein the tensile strength TS is higher than 1180 MPa.

16. The steel sheet as recited in claim 5 wherein the tensile strength TS is higher than 1180 MPa.

17. The steel sheet as recited in claim 1 wherein Cr≤0.050%.

18. The steel sheet as recited in claim 17 wherein Cr≤0.01%.

19. The steel sheet as recited in claim 1 wherein 0.100%≤Mo≤0.400%.

20. The steel sheet as recited in claim 19 wherein 0.100%≤Mo≤0.300%.

21. The steel sheet as recited in claim 1 wherein 0.020%≤Nb≤0.100%.

* * * * *